May 21, 1968     V. AHMED     3,384,387
TOW BAR ATTACHMENT
Filed Aug. 29, 1966     2 Sheets-Sheet 1
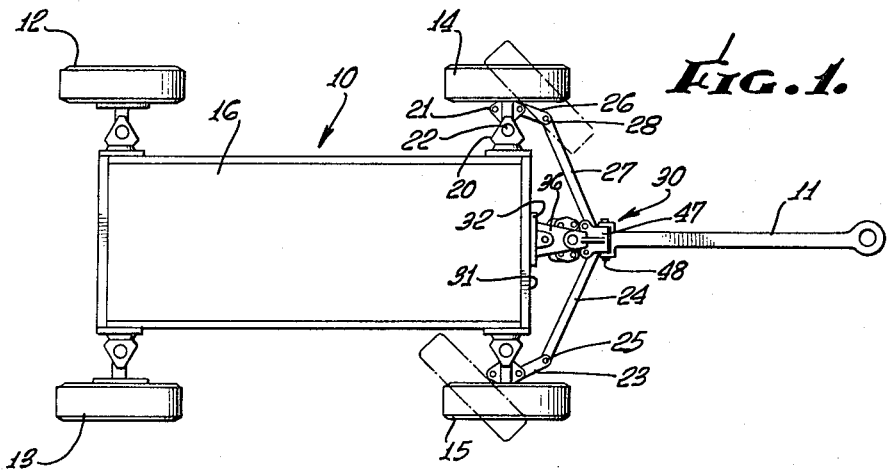
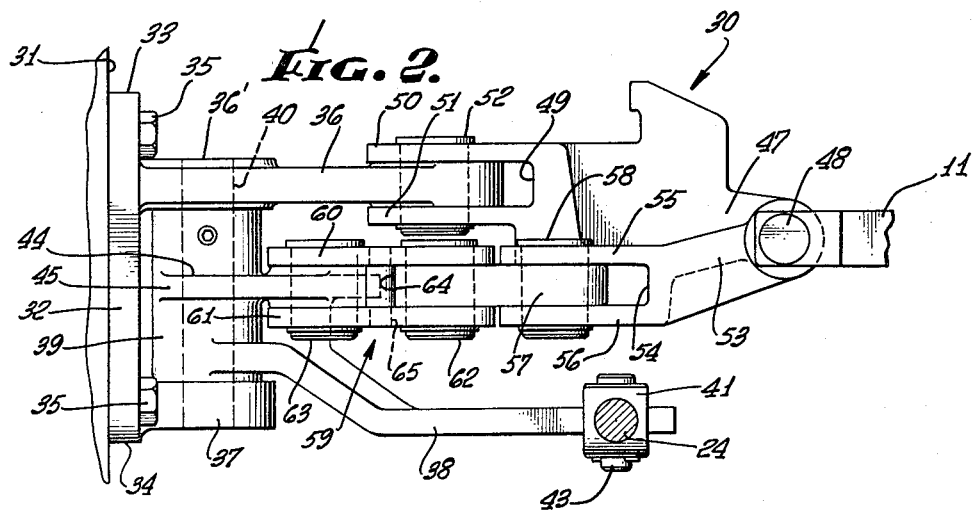
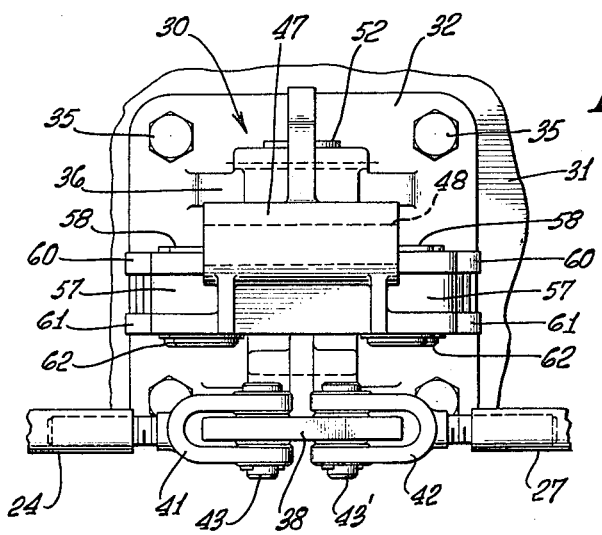
INVENTOR.
VIQUAR AHMED
BY Beehler & Arant
ATTORNEYS.

May 21, 1968 V. AHMED 3,384,387
TOW BAR ATTACHMENT
Filed Aug. 29, 1966 2 Sheets-Sheet 2
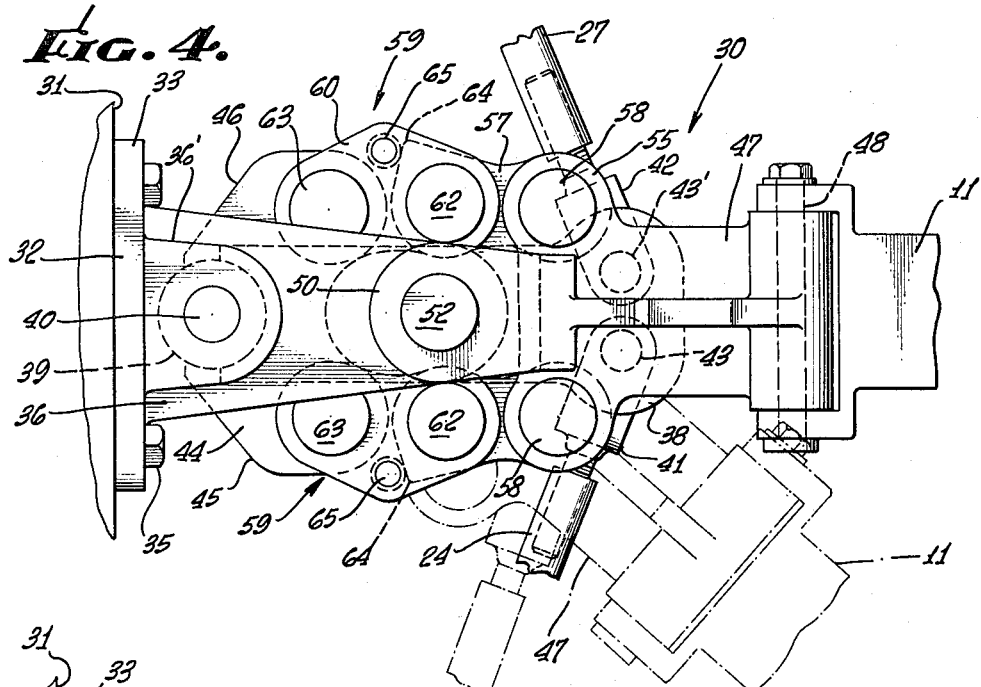
INVENTOR.
VIQUAR AHMED
By Beehler & Arant
ATTORNEYS.

United States Patent Office 3,384,387
Patented May 21, 1968

3,384,387
TOW BAR ATTACHMENT
Viquar Ahmed, Los Angeles, Calif., assignor to Aerol Co., Inc., Los Angeles, Calif., a corporation of California
Filed Aug. 29, 1966, Ser. No. 575,668
7 Claims. (Cl. 280—103)

The invention relates primarily to a heavy duty tow bar or draw bar attachment for the towing of trailers having steerable wheels, which are towed by means of a tractor unit or some appropriate towing vehicle. The invention is especially advantageous when incorporated in a tow bar device which is attached by means of tie rods to the usual knuckle joints for wheels which enjoy automobile type steering.

One of the commonest difficulties in the manipulation of a trailer by means of a tractor or towing vehicle is jackknifing of the rig when the trailer is being backed and maneuvered into an appropriate parking location. To properly manipulate a trailer takes considerable experience and skill. At times space is limited and the excessive length of the rig, namely the length of the trailer added to the length of the towing vehicle, needs considerably more space than is customarily available to make manipulation easy. For that reason the operator often has to make many passes forward and in reverse to ease the trailer little by little into a proper position.

When the tractor is turned at an angle greater than permitted by the maximum cramp angle of the towed vehicle a stop is usually provided to prevent further turning. Usually a skilled operator will heed the action of the stop and change the direction of manipulation. There are unfortunately, however, many operators who fail to heed the stops and when the towing vehicle imposes turning forces beyond the stop one of a number of undesirable things may happen. It may be that the tow bar or draw bar will bend. Tires may skid sideways or the stop fails and the wheels then turn beyond the maximum cramp angle causing damage. Sometimes also the tie rods will buckle and under conditions of great strain castings are actually broken because of the leverage present, particularly close to the stop. When some of these things happen, the equipment is rendered temporarily out of service. Even under the least serious condition, the equipment is damaged and must be repaired. Often over rough surfaces tremendous stresses and strains are built up in the towing attachment. Certain torque limiting devices heretofore employed, although capable of disconnecting the steering apparatus when the tow bar has been moved beyond the steering range, have suffered damage and breakage under continued use, especially where camming and sliding surfaces have been depended upon.

It is therefore among the objects of the invention to provide a new and improved tow bar and steering mechanism which substantially minimizes the usual troubles due to jackknifing.

Another object of the invention is to provide a new and improved tow bar and steering mechanism which is so fabricated that additional turning force cannot be applied to the steering mechanism after the maximum cramping angle has been reached.

Still another object of the invention is to provide a new and improved torque limited tow bar attachment which is successful in avoiding damage to tie rods, knuckle joints, draw bar fixtures and the draw bar itself when the towing vehicle is turned at an unnecessarily great angle with respect to the trailer.

Still another object of the invention is to provide a new and improved torque limiting tow bar attachment for a tow bar or draw bar which provides a firm nonyielding connection between the towing vehicle and the trailer within a predetermined degree of cramp angle for the wheels of the trailer and which is so designed that it will yield immediately and without resistance if the angle is exceeded, thereby completely avoiding any strain upon the parts, the mechanism remaining freely rotatable until the towing vehicle reassumes its proper direction.

Still another object of the invention is to provide a new and improved torque limiting tow bar attachment for a draw bar or tow bar mechanism which allows for much greater maneuverability of both the towing vehicle and the trailer when need arises to manipulate the combination in a limited space thereby to minimize parking time and also to minimize time required to resume the haul.

Further included among the objects of the invention is to provide a new and improved tow bar attachment acting on the principle of a flexible linkage capable of automatic disconnection when the steering limit has been exceeded, and wherein rugged positive stops are depended upon at the limit of jackknifing motion, such stops being of such character that the vehicle itself can be slid when the limit of motion has been exceeded rather than having the attachment damaged.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 1 is a plan view showing the tow bar attachment attached to a typical four wheel steering trailer.

FIGURE 2 is a side elevational view of the attachment taken on the line 2—2 of FIGURE 1.

FIGURE 3 is a front elevational view of the tow bar attachment.

FIGURE 4 is a plan view of the attachment showing in solid lines a fore and aft towing relationship and in broken lines a relationship near the steering limit.

FIGURE 5 is a plan view similar to FIGURE 4 showing the relationship of parts beyond the steering limit.

In an embodiment which is primarily for the purpose of illustrating the principles involved in the tow bar attachment here disclosed, there is shown a typical four wheel steering trailer indicated generally by the reference character 10, having attached thereto a conventional tow bar or draw bar 11, the draw bar being shown in position for attachment to a tractor or towing vehicle (not shown).

The four wheel trailer is provided with fixed rear wheels 12 and 13 and steerable front wheels 14 and 15, there being a trailer body 16 supported upon the wheels.

It is significant that the front wheels are steering wheels and equipped with a steering mechanism substantially the same as those used in automotive vehicles and commonly designated as an automotive knuckle-type steering, incorporating tie rods and king pins in the usual arrangement. More particularly, there is provided on each side of the front portion of the trailer body 16, a bracket 20 having a fixture 21 pivotally secured thereto by means of a king pin 22. A link 23 has a tie rod 24 attached thereto by a conventional steering knuckle 25. On the opposite side is a similar link 26, tie rod 27, and steering knuckle 28. In solid line, the wheels 14 and 15 are shown in straightforward towing position. Broken lines show the wheels in the position of maximum cramping angle.

A draw bar attachment or steering torque limiting mechanism indicated generally by the reference character 30 is shown attached to a front wall 31 of the trailer body 16. The draw bar attachment is embodied in part in a mounting base 32 having an upper side 33 and a lower side 34. Bolts 35 secure the mounting base to the front wall.

Extending forwardly from the base 32 are two vertically spaced parallel plates, namely a draw bar plate 36 on the upper side and a steering mount plate 37 on the lower side. Located intermediate the draw bar plate and the steering mount plate is a steering mount 38 which includes a bushing 39. The bushing 39 extends between rear ends of the plates 36 and 37, where it is pivotally mounted upon a rear pivot pin 40. The plate 36 is reinforced at 36′ for added strength where the pivot 40 extends through it. At the forward end of the steering mount 38 are yokes 41 and 42 on respective opposite sides to which the respective tie rods 24 and 27 are secured. A pin 43 pivotally secures the yoke 41 to the steering mount 38 and a similar pin 44 pivotally secures the yoke 42 to the same steering mount.

In order that the moving parts be better balanced as to their location, there is provided upon the bushing 39 an intermediate stop plate 44. The form of the stop plate is shown better in FIGURES 4 and 5 where a surface 45 forms a stop on one side and a similar surface 46 forms a stop on the other side. These stops establish the limit of movement of the steering mount 38 at extremities of its arc of movement. The stops are adapted to engage the front surface of the mounting base 32.

Pivoted to the upper front portion of the device is a draw bar bracket 47, to which the tow bar or draw bar 11 is directly connected by means of a draw pivot 48. The draw bar bracket is provided at its rear edge with a slot 49 forming respective upper and lower flanges 50 and 51 respectively. A pivot pin 52 serves to pivotally attach the draw bar bracket 47 to the draw bar plate 36.

The draw bar bracket is also connected to the steering mount 38 by means of a series of links, on each side of the device. More particularly, a thickened portion 53 has a rearwardly facing slot 54 formed therein, on each side, the slot providing respective upper and lower sections 55 and 56. A single link 57 has its forward end pivotally attached to the sections 55 and 56 by means of a clevis pin 58. A rear double link indicated generally by the reference character 59 consists actually of spaced parallel upper and lower parts 60 and 61. At their forward ends the parts overlie the rear end of the single link 57 and are pivotally attached thereto by means of a clevis pin 62 in each instance. Rear ends of the parts 60 and 61 overlie upper and lower sides of the stop plate 44 to which they are pivotally connected by means of a clevis pin 63 in each instance.

Of particular significance is the presence of a stop in the form of a cam 64, see FIGURES 4 and 5, which is actually an extension of the material of the single link. The stop or cam is positioned to cooperate with a stop pin 65 which extends between the upper and lower parts 60 and 61 of the double link 59. Parts on one side of the device are precisely like parts on the opposite side except for reverse orientation. It should also be noted that the single link is somewhat smaller at the midportion and curved at a radius somewhat related to the outside diameter of the clevis pins. There is a depression also on the inner edges of the double link. This is to assist nesting of the links in extreme positions so that the links and pivot pins acting together serve as a limiting stop for rotation of the draw bar bracket 47.

In operation let it be assumed that initially the draw bar 11 extends straight forward from the towed vehicle as shown in FIGURES 1 and 2 and by solid line position of FIGURE 4. With the draw bar in the position described, the front wheels 14 and 15 will be facing in fore and aft alignment and the tie rods 24 and 27 will be in the solid line position of FIGURE 1. When the draw bar 11 is swung from the position of FIGURES 1 and 4, for example, to the broken line position 11′ of FIGURE 4, the steering mount 38 will be drawn with it rotating clockwise as viewed in FIGURE 4 so that the tie rod 24 is moved to the broken line position 24′ of FIGURE 4. This causes the front wheels 14 and 15 to turn clockwise as viewed in FIGURE 1. What causes the turning of the steering mount 38 is the linkage on the upper side of the attachment as viewed in FIGURE 4 which would be on the left side of the attachment when facing forward from the towed vehicle. The draw bar bracket 47 pulls upon the single link 57 and this in turn pulls upon the double link 59. The double link 59 in turn pulls upon the upper or left-hand side of the stop plate 44 causing it to rotate in a clockwise direction as viewed in FIGURE 4. Moreover, engagement of the stop pin 65 with the stop or cam 64 of the single link 57 assists in locking the left-hand linkage together.

When the steering mount 38 reaches the limit of its movement, the surface 45 forming a stop on the right-hand side is brought into engagement with the base 32 as shown in FIGURE 5. When this engagement takes place, the steering mount 38 can no longer rotate and the front wheels 14 and 15 will have reached the limit of their rotation. The draw bar bracket 47, however, can continue to rotate in a clockwise direction about its pivot pin 52, to the extent illustrated in FIGURE 5, wherein the linkage and clevis pins nest. This can be as much as at a 90 degree angle with respect to a straight fore and aft position. After engagement of the stop 45 with the base 32, the linkage continues to rotate, but the stop or cam 64 is pulled away from the complementary stop pin 65 on the left-hand side and the links 57 and 59 on the right-hand side fold, offering no resistance to a continued swing of the draw bar bracket clockwise. Accordingly, even though the steering mount 38 and the wheels 14 and 15 remain in fixed position at the limit of their motion, there will be no stress or strain upon any other parts as the draw bar bracket continues to be swung around until it reaches the limit of its motion defined by the nesting of the linkage and clevis pins as shown in FIGURE 5.

When the time comes to shift the draw bar 11 in the opposite or counterclockwise direction as viewed in these figures, the right-hand linkage unfolds and the left-hand linkage begins to straighten out, until the linkage reaches a point where the right-hand stop pin 65 is brought into engagement with the righthand stop or cam 64 of the corresponding single link 57. At this point tension on the draw bar bracket will be again passed through the linkage to the steering mount 38 and this will be rotated, now in a counterclockwise direction, causing the front wheels 14 and 15 to be returned to a fore and aft position. Should the draw bar bracket be swung further in a counterclockwise direction, engagement of the right-hand stop pin with the right-hand stop or cam 64 will continue until the steering mount reaches the limit of its swing in that direction, namely until the stop 46 on the stop plate 44 strikes the base 32. Here the same breaking of linkage will occur but in the opposite direction, as has already been described for a right-hand swing in connection with FIGURE 5.

Moreover, by using a combination of single and double links with relatively heavy clevis pins and a stop pin 64 acting as a beam, retained at both ends, an extremely rugged and dependable linkage is produced which will withstand great stresses. Moreover, by further locating the single link in a slot in the draw bar bracket and locating the draw bar plate in a similar sort of slot in the draw bar bracket, great additional strength is made possible without departing from the desired compact arrangement. The parts which are depended upon to transfer the pull from the tractor or towing vehicle to the drawn vehicle can be made just as rugged as is necessary, depending upon the loads encountered. The steering apparatus need not, however, be made comparably rugged because adequate strength can be depended upon with parts lighter in section since they cannot be strained beyond the limits of movement for which they are designed. As a result of the freedom of motion allowed the draw bar beyond the limit of motion of the steering mount, the lead or towing vehicle is permitted to manipulate considerably without the necessity of moving the towed vehicle until it can be maneuvered into the desired direction for a further pull upon the drawn vehicle.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letteres Patent is:

1. A draw bar attachment for a vehicle having steerable front wheel assemblies equipped with tie rods, said attachment comprising a bracket having a base adapted for attachment to a towed vehicle, a draw bar plate and a steering mount plate in parallel spaced relationship on said base, a link assembly between said plates, a rear pivot pin extending between said plates, and a steering mount pivotally mounted at the rear end on said pivot pin and adapted to swing between opposite limits of movement of a steering arc, the forward end of said steering mount being adapted to have said rods connected thereto, a stop means in engagement with said rear pivot pin adjacent said steering mount, a draw bar bracket having a pivotal attachment to the forward end of said draw bar plate, a pair of forward links located one on each side of the draw bar bracket, the forward end of each link having a pivotal attachment to said draw bar bracket, a pair of rear links located one on each side, the rear end of each rear link having a pivotal attachment to said stop means, said forward and rear links on each side having a pivotal connection therebetween, and complementary stop means respectively on the forward and rear links on each side, said complementary stop means on the side away from the direction of swing being in engagement with said draw bar bracket and said steering mount while said draw bar bracket and said steering mount are swinging through a steering movement between said opposite limits of movement of the steering mount, said complementary stop means on the side away from the direction of swing being out of engagement when the draw bar bracket is swung in an arc which exceeds the limit of movement of the steering mount.

2. A draw bar attachment according to claim 1 wherein there is a stop between the base and the steering mount on each side which fixes the limits of movement of the steering mount.

3. A draw bar attachment according to claim 1 wherein one link on each side is a single link having a stop thereon and the other link on each side is a double link having spaced parts overlying said single link and a stop pin between said spaced parts in a position of engagement with said stop on the single link thereby to form said complementary stop means.

4. A draw bar attachment according to claim 3 wherein the single link on each side is attached respectively to the draw bar bracket and the double link, and the double link is attached respectively to the single link and the steering mount.

5. A draw bar attachment according to claim 4 wherein said draw bar bracket has a slot on each side wider than the thickness of the single link, and a clevis pin pivotally securing each said single links in the respective slot.

6. A draw bar attachment according to claim 1 wherein said draw bar bracket has a slot on the top side wider than the thickness of the draw bar plate, said draw bar plate being located in said slot, and a pivot pin rotatably securing said draw bar bracket to the draw bar plate.

7. A draw bar attachment according to claim 1 wherein the pivot connection between the forward link on each side and the draw bar bracket is forward of the pivotal attachment of the draw bar bracket to the draw bar plate, and wherein the pivotal attachment of the rear link on each side to the steering mount is intermediate the location of the pivotal attachment between the draw bar bracket and the draw bar plate and the location of the rear pivot pin.

References Cited

UNITED STATES PATENTS

| | | | |
|---|---|---|---|
| 3,108,821 | 10/1963 | Krauss | 280—103 |
| 3,195,915 | 7/1965 | Moore | 280—103 |
| 3,311,387 | 3/1967 | Klemm et al. | 280—103 |

LEO FRIAGLIA, *Primary Examiner.*

L. D. MORRIS, *Assistant Examiner.*